(12) United States Patent
Parker

(10) Patent No.: US 6,502,791 B2
(45) Date of Patent: Jan. 7, 2003

(54) LIGHT DUTY ADJUSTABLE PIPE SUPPORT ASSEMBLY

(76) Inventor: Philip A. Parker, Rte. 2, Box 2264, Naples, TX (US) 75568

( * ) Notice: Subject to any disclaimer, the term of this patent is extended or adjusted under 35 U.S.C. 154(b) by 0 days.

(21) Appl. No.: 09/870,195

(22) Filed: May 30, 2001

(65) Prior Publication Data

US 2002/0020787 A1 Feb. 21, 2002

Related U.S. Application Data

(63) Continuation-in-part of application No. 09/491,345, filed on Jan. 26, 2000, now abandoned.
(60) Provisional application No. 60/119,261, filed on Feb. 9, 1999.

(51) Int. Cl.[7] .................................................. F16L 3/08
(52) U.S. Cl. ...................... 248/70; 248/405; 248/406.1; 254/13
(58) Field of Search ....................... 248/346.01, 346.05, 248/406.1, 70, 405, 519, 676, 678; 52/298, 410, 408; 254/85, 13, 29 R

(56) References Cited

U.S. PATENT DOCUMENTS

| | | | | |
|---|---|---|---|---|
| 813,588 A | * | 2/1906 | Rollins | |
| 1,148,854 A | * | 8/1915 | Osh | |
| 1,541,129 A | * | 6/1925 | Farley | |
| 1,861,436 A | * | 6/1932 | Collins | |
| 2,103,811 A | * | 12/1937 | Davis | |
| 2,654,569 A | * | 10/1953 | Cooper | |
| 3,769,190 A | * | 10/1973 | Deem, Jr. | |
| 4,502,653 A | | 3/1985 | Curtis | 248/55 |
| 4,513,934 A | | 4/1985 | Pruyne | 248/49 |
| 5,028,149 A | | 7/1991 | Hardtke | 384/46 |
| 5,102,073 A | | 4/1992 | Lestenkof | 248/49 |
| 5,217,191 A | | 6/1993 | Smith | 248/55 |
| 5,335,887 A | | 8/1994 | Torrens | 248/49 |
| 5,685,508 A | | 11/1997 | Smith | 248/55 |
| 5,816,554 A | | 10/1998 | McCracken | 248/346.01 |
| 5,829,718 A | | 11/1998 | Smith | 248/55 |
| 6,017,005 A | | 1/2000 | Smith | 248/55 |
| 6,283,420 B1 | * | 9/2001 | Neuber, Jr. | |

* cited by examiner

Primary Examiner—Korie Chan
(74) Attorney, Agent, or Firm—Slater & Matsil, L.L.P.

(57) ABSTRACT

An improved light duty easily adjustable pipe support assembly having a flat base, cushion pad, and free turning adjustment rods. Each adjustment rod has an adjustment knob with friction locking capabilities that permits ease in the turning of the rod while preventing inadvertent turning. A pipe support devise engaged upon the adjustment rods travel vertically up or down along the rods when the knobs are turned. A pipe roller assembly has the capability to compensate for lateral as well as linear movement of the piping system it is intended to support.

27 Claims, 11 Drawing Sheets

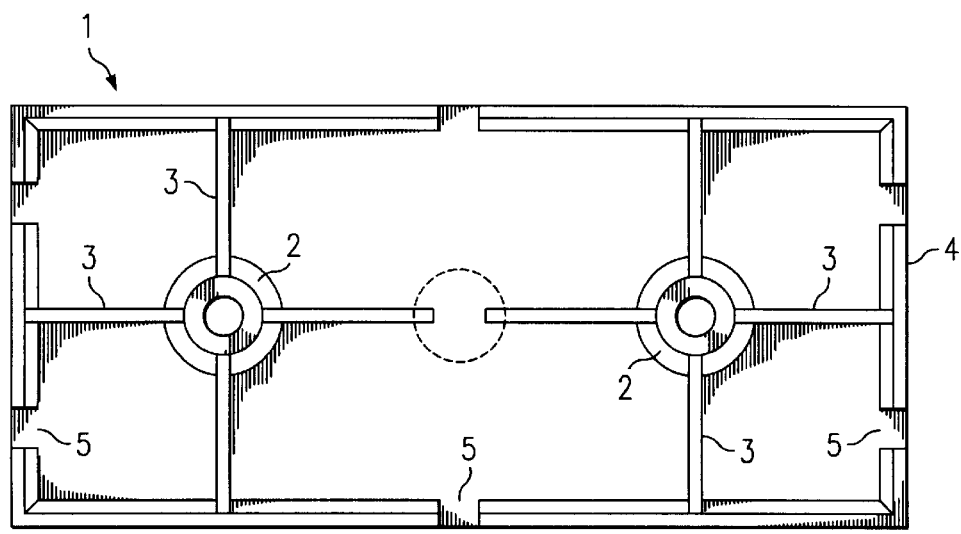
Fig. 1
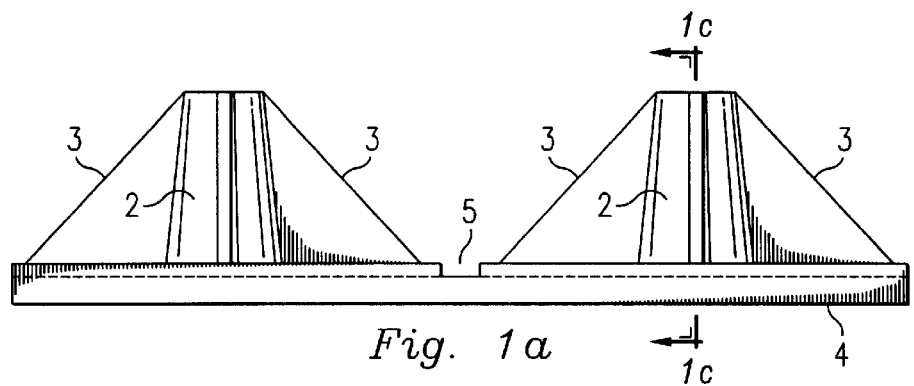
Fig. 1a
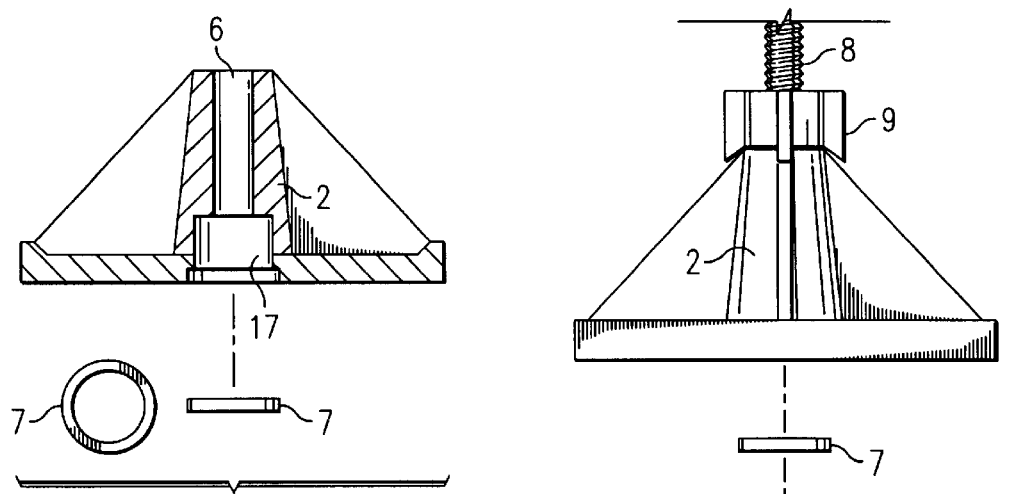
Fig. 1b
Fig. 2

LIGHT DUTY ADJUSTABLE PIPE SUPPORT ASSEMBLY

BACKGROUND—CROSS-REFERENCE TO RELATED APPLICATIONS

This application is entitled to the benefit of Provisional Patent Application Ser. No. 60/119,261, filed Feb. 9, 1999. And is a continuation-in-part of Utility patent application Ser. No. 09/491,345 filed Jan. 26, 2000, now abandoned.

FIELD OF THE INVENTION

This Invention is in the field of piping supports and apparatus.

BACKGROUND OF THE INVENTION

In the fields of plumbing and electrical, it is common to install piping systems on top of a flat or near flat roof. Typically, there is a means employed to support this piping above the roof surface, thus avoiding direct contact between the roof and the pipe.

The common means to support this pipe was first to use wooden blocking. This blocking was often adhered to the roof surface with mastic. Often a metal pan was used when the blocks were attached to the roof. These blocks typically deteriorated with age causing damage to the roof.

A more recent device has recently been utilized to support piping. This device is the free standing roof support. Some variations of this device are of fixed height not allowing for vertical adjustments. Others have utilized vertical positioned threaded rods to permit adjustment of the piping. These rods are in some way rigidly affixed to a flat base plate made of concrete, steel, or plastic. Onto these rods are attached a conventional pipe roller assembly or other commonly employed apparatus to support or secure the piping.

The roller assemblies typically have a center rod passing through the axis with a collar at either side of the roller. Threaded nuts are utilized as the means of attachment of the roller assembly to the fixed vertical rods.

The utilization of either of these devices commonly requires the adding of a pad in order to protect the roof surface from sharp edges on the support or from depressed weight of the device and piping it supports. This pad is typically place beneath the support after the piping system installation has been completed. There is risk of potential damage to the roof surface from sharp edges on the support during the time between placement of the support and final completion of the system.

To achieve vertical adjustment of the support apparatus thereby adjusting the elevation of the supported piping, it has been necessary to first loosen the threaded nuts, reposition the support apparatus at the selected elevation and finally to re-tighten the rods. Tools such as wrenches or pliers are commonly used to make these adjustments.

Because the supported piping is typically low and near to the roof surface, the installer is required to first stoop or bend over the support. Using a wrench to loosen and then turn the nut, he must thread the nut on the rod. He must then hold the piping at the new position while at the same time re-tightening the nut. It is easy to understand how this process can require two individuals to perform, adding increase costs of installation.

This method of achieving vertical adjustment of the support device has seemed the most practical. It is employed in all known devices. The disadvantages of this means of adjustment are however made clear.

As an example, the time needed to make adjustments to many pipe supports devices can become overwhelming when the installation involves many feet of piping. Roof surfaces often appear flat but most often are not because of the need to provide for drainage of rainwater from the roof. Because it is preferred that piping systems be installed level without rises and falls, it often becomes necessary to make many height adjustment in the piping system. The need to adjust and often re-adjust many pipe supports becomes not only time consuming but also physically straining.

There clearly should be a better means of adjusting the height if these pipe supports.

SUMMARY

The invention is a light duty easily adjustable pipe support assembly having a base assembly. This base assembly is comprised of a rectangular shaped molded plastic base having a flat bottom surface, concentric cones rising from the top, and reinforcing ridges to provide added strength. A full size neoprene pad is adhered to the underside of the base. A freely rotating threaded adjustment rod having a hand operated adjustment knob, positioned vertically atop each cone and assembled onto the base.

A pipe roller support is attached at the ends of each adjustment rod. The pipe roller support is attached to the base assembly by the turning in place of the two adjustment rods. Vertical height adjustment is achieved by the turning the adjustment knobs of the threaded adjustment rods.

The pipe roller support is comprised of a round flexible roller assembly with a center hole having a cylinder shaft passing through the hole. This shaft has female threaded holes at either end.

The added capability of the roller support to compensate for lateral force being exerted on the piping system gives the invention a superior advantage over present art.

OBJECTS AND ADVANTAGES

Accordingly, several objects and advantages of my invention are:

A) To provide a light duty durable pipe support for use on a flat roof that is durable and weather resistant at an affordable cost;

B) To provide a pipe support that is less expensive to install and maintain;

C) To provide a pipe support that when first installed, is easily adjusted without the need for tools;

D) To provide a pipe support that is conveniently re-adjusted during the duration of its use when required by changing conditions;

E) To provide a pipe support that has a cushioned pad on the bottom surface to prevent damage to the roof surface.

Further objects and advantages are to provide an easily adjustable pipe support that allows the skilled installer to install a piping system across a seemingly flat roof while easily making height adjustments needed to insure a consistently level piping system.

A further advantage is that the invented adjustable pipe support will permit an often less skilled maintenance worker to re-adjustment the height of the piping. Often is the case that due to thermal expansion and contraction, the pipe supports for a piping system installed over a flat roof will require re-adjustments. Because the invented adjustable pipe support is easily adjusted, there is far less chance that obvious necessary re-adjustments will be neglected because the proper tools are not conveniently available. Therefor, future potential damage to the roof surface can be avoided.

Further, the added capability of the roller support to compensate for lateral force caused by thermal expansion being exerted on the piping system gives the invention a superior advantage over present art.

Another advantage is the friction locking means of securing the adjustment knobs in place to prevent inadvertent changes in the elevation of the piping.

DESCRIPTION OF DRAWINGS

FIG. 1 is a top view of the molded plastic base.

FIG. 1-a is a side view of the base.

FIG. 1-b is an end sectional view of the base.

LIST OF REFERENCE NUMERALS

Figure 2A:
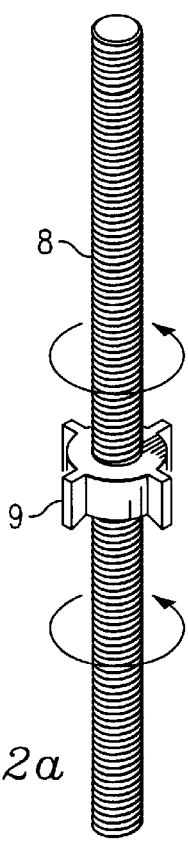
FIGS. 2 through 2-c are views of the cone portion of the base and views of the threaded adjustment rod demonstrating the inserted threaded adjustment rod with adjustment knob.

1 Base
2 Concentric cone
3 Base reinforcement flanges
4 Base reinforcement ridges
5 Base drainage notches
6 Adjustment rod insert hole
7 Plastic cover disk
8 Threaded adjustment rod
9 Adjustment knob
11 Spacer
12 Locking flanged nut
13 Pipe roller support
14 Roller
15 Cylinder shaft
16 Female threaded hole
17 Cylinder cavity
18 Neoprene pad
19 Threaded nut
20 Collar
21 Threaded rod
22 Channel support
23 Conventional pipe roller
24 Knob Threaded insert
25 Wave Washer
26 Indentation
27 Extrusion
28 Round Base
29 Unthreaded collar
30 Fitted Roller Assembly
31 Deflection Cup
32 Pipe Roller
33 Compression Spring
34 Knob Recession
35 Grasping Collar
36 Round Hole
37 Cavity
38 Spring Stopper Base
39 Pipe
40 Lateral Force
41 Vertical Force

DESCRIPTION OF THE INVENTION

The invention is a light duty easily adjustable pipe support assembly. As shown in FIGS. 1, 1-a, and 1-b, base 1, constructed of molded plastic, has two concentric cones with cylinder cavity 2. The cones have reinforcement flanges 3 at four sides. Top view FIG. 1 shows the arrangement of the two cones 2, base reinforcement flanges 3, base reinforcement ridges 4, and base drainage notches 5.

Side view FIG. 1-a displays the reinforcement flanges 3 as well as reinforcement ridges 4. These ridges and flanges permit the construction of the support base from lightweight plastic by providing additional strength and durability. Base drainage notches 5 appear along all sides of the base. This feature prevents the build up of rainwater and other liquids atop the base.

End sectional view FIG. 1b shows the interior of cone 2. Adjustment rod insert hole 6 extends from the top of the cone to cylinder cavity 17. The cavity has a flat smooth top surface. Also shown is a top and side view of plastic cover disk 7. This disk is adhered to the recessed portion of the lower extremities of the cone after assembly of the threaded adjustment rod.

Figure 2B:
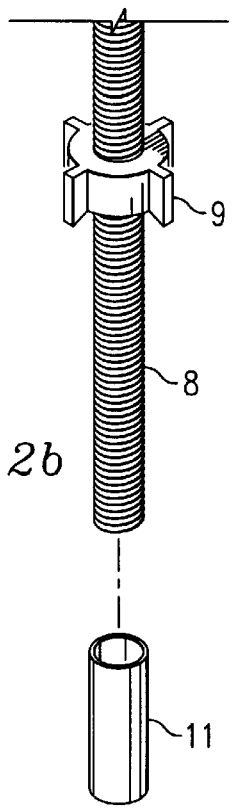
Figure 2C:
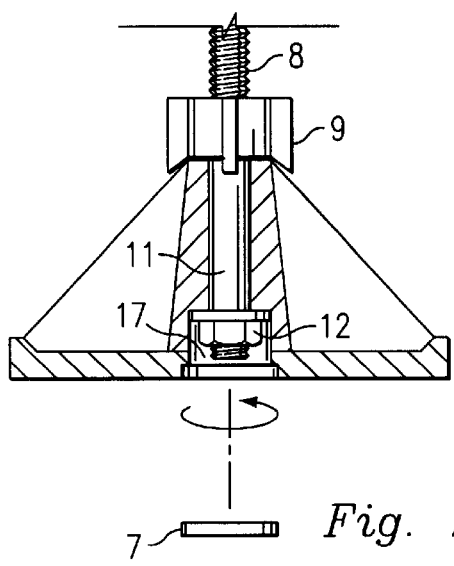

Turning to FIG. 2, the technique of inserting threaded adjustment rod 8 into each cone 2 is demonstrated. First, in FIG. 2-a, an adjustment knob 9 is affixed to each rod. This is accomplished by threading the knob onto one end of the rod and then applying a conventional thread locking adhesive to the threads and properly positioning the knob. The knob is of convention plastic construction having a threaded metal insert.

Next, as shown in FIG. 2b, spacer 11 is placed on the rod below the knob. The assembled rod is then inserted from the top into the cone, FIG. 2-c. Locking flanged nut 12 is then with an applied thread-locking adhesive, affixed to the end of the rod. This nut is tightened only sufficiently to ensure firmness in the base while still permitting the free turning of the threaded adjustment rod. Finally, as shown in FIG. 2, the threaded rod is in place with spacer and locking flanged nut. Plastic cover disk 7 is adhered to the bottom of each cylinder cavity 17 thus closing the cavity compartment. Lastly as viewed in FIG. 2, neoprene pad 18 is adhered to the base bottom surface using a common adhesive.

Figure 3:
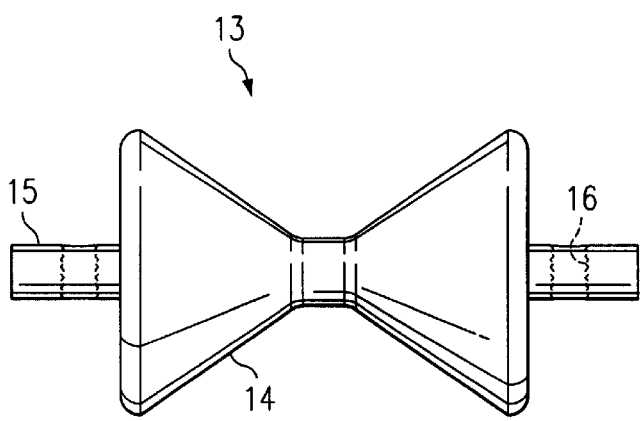
FIGS. 3 and 3-a are views of the pipe roller support.

Now turning to the assembly of pipe roller support 13, FIG. 3. Roller 14 is of conventional construction. A rubber roller is found to provide adequate support with the added benefit of the cushion and weathering capabilities. Cylinder shaft 15 is inserted through the axis of the roller. Viewing FIG. 3-a, the spacing of the round hole through the center of the roller permits ease in turning against the cylinder shaft. Female threaded holes 16 are located at either end of the cylinder shaft.

Figure 4:
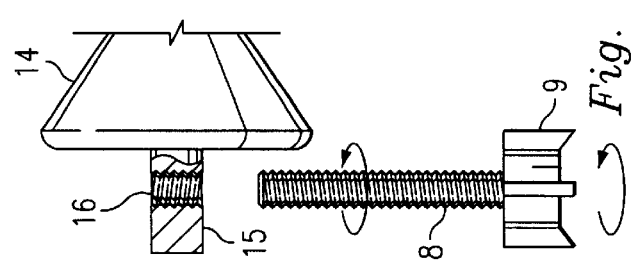
FIG. 4 details the method of attaching the roller support to the adjustment rods.

As demonstrated in FIG. 4, pipe roller support 13 is attached to the ends of threaded adjustment rods 8 by the turning of the rods, thus engaging the female threads in holes 16. Thus, threading the pipe roller support onto the adjustment rods completes the assembly of the invented light duty adjustable pipe support assembly.

Additional Embodiments

Figure 8:
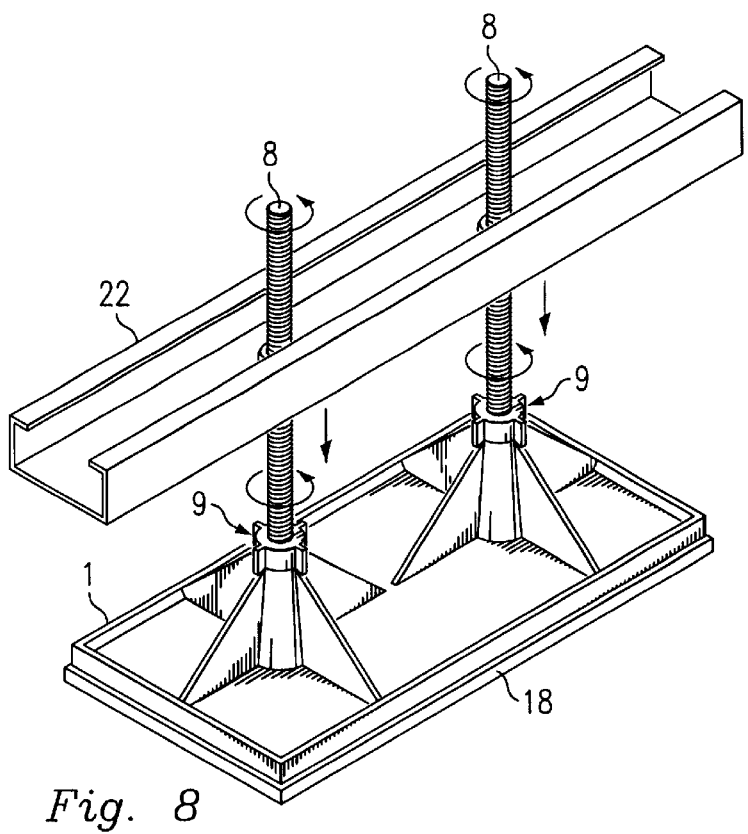
FIGS. 8 and 8a demonstrate another embodiment of the adjustable pipe support assembly.
Figure 8A:
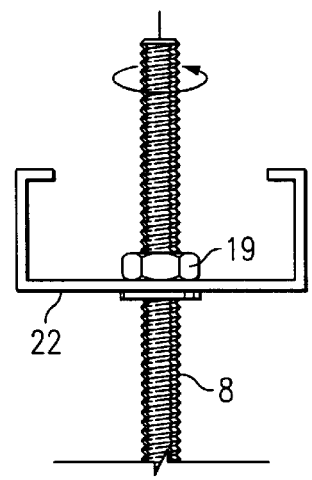

As demonstrated, the vertical adjustment of the pipe roller support is made easy because of the freely turning adjustment rods. Likewise other devices can replace the roller permitting other types of piping and even equipment to be supported from my adjustable pipe support assembly. For instance, as shown in FIG. 8, replacing the roller with channel support 22 allows for conduits to be secured to the support. Travel along the threaded adjustment rod 8 is achieved by turning and engaging threaded nuts 19 that are affixed to the channel support. FIG. 8-a shows threaded nut 19 as it is affixed to the channel support. Again, the turning of threaded adjustment rod 8 enables the channel to elevated along the rod.

Figure 9:
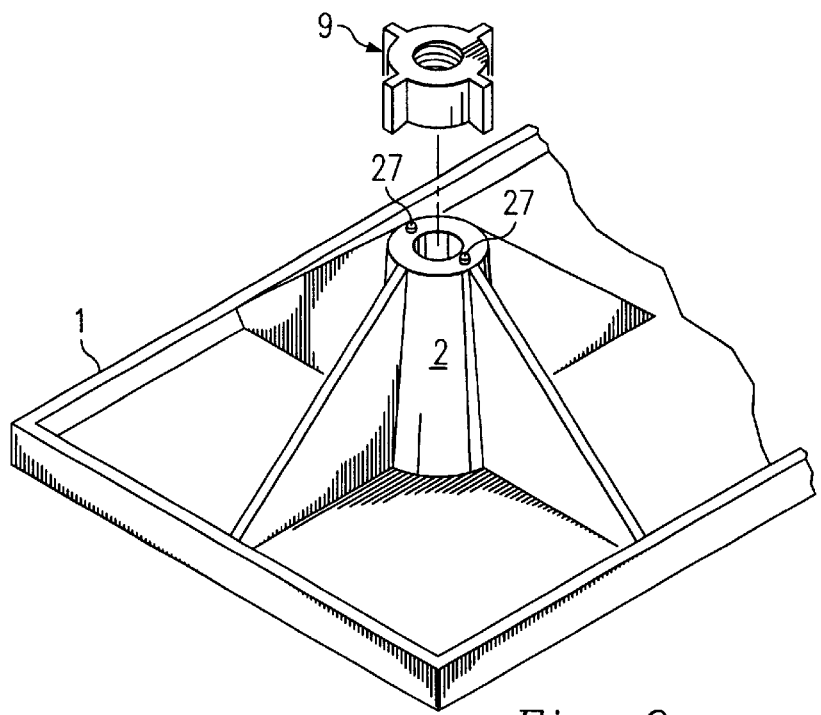
FIGS. 9 through 9-c show another embodiment of the knob assembly.
Figure 9A:
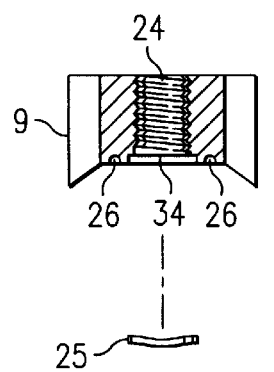
Figure 9B:
Figure 9C:
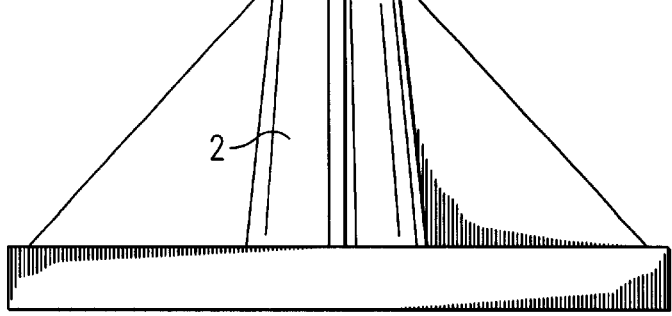

Additionally, having an adjustment knob with a means to provide a friction locking technique to prevent any unexpected turning of the threaded knobs would further enhance the performance of the device. As shown in FIG. 9, by the addition of two (2) extrusions 27 atop each cone 2 of the base, and then as illustrated in FIG. 9-a having corresponding indentations 26 at the underside of the adjustment knob would provide the means of having this friction locking capability. These indentations totaling four (4) correspond in location to the two extrusions on the base except that by having four rather than the matching two, the knob is able to rest firmly against the top of each cone at any position providing that the ridges along the sides of the knob match the corresponding and aligning base reinforcing ridges. In essence, the two sets of ridges, the base and the knob ridges act as a aligning method to assure that the indentations match the extrusions.

Further disclosed in FIG. 9-a, is wave washer 25. This washer which is of sufficient size and tension to provide vertical force upward for the knob and rod assembly when there is no weight on the pipe support. As shown in FIG. 9-b, the washer is round and of size to permit it to fit within knob recession 34 when weight is applied to the support.

FIG. 9-c reveals the assembly whereby the wave washer is placed along the threads of adjustment rod 8 and between adjustment knob 9 and concentric cone 2. In this Figure, extrusion 27 are again revealed.

Figure 10:
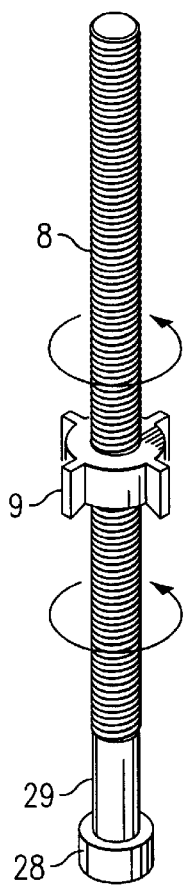
FIGS. 10 through 10-c show another embodiment of the threaded adjustment rod.
Figure 10A:
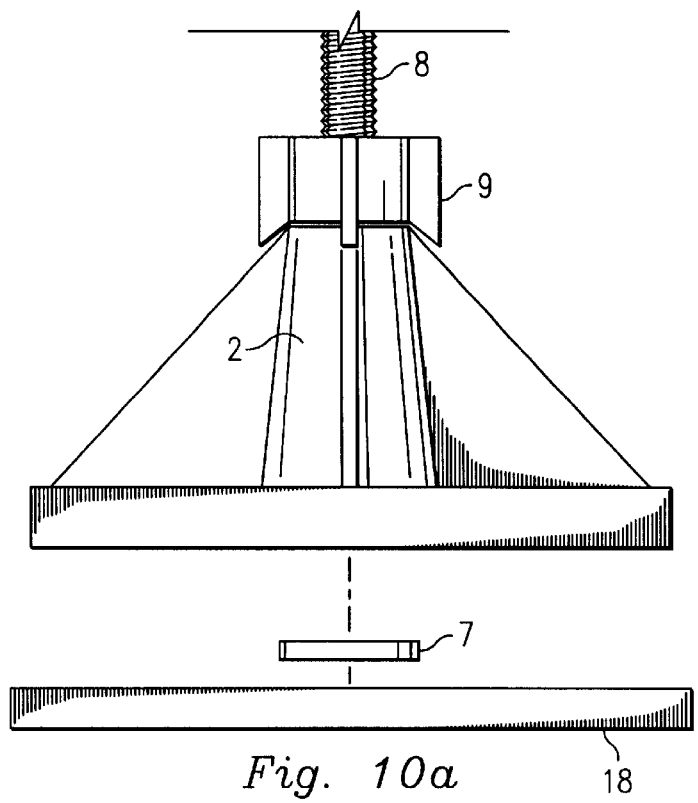
Figure 10B:
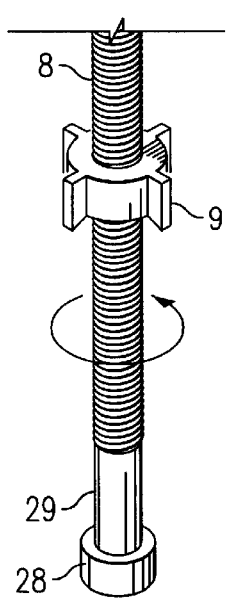
Figure 10C:
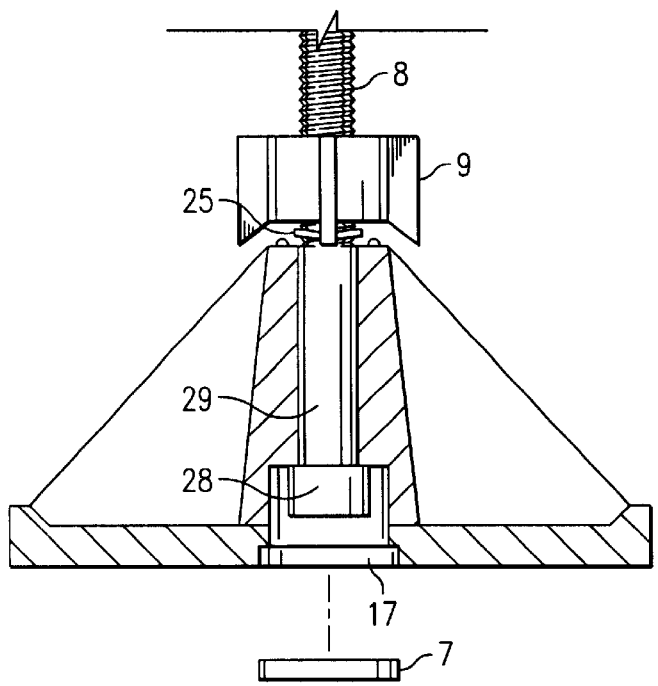

Now turning to FIG. 10, a alternate threaded adjustment rod 8 is disclosed. This embodiment of the rod is machined so that round base 28 is present at the base of the rod. Further, unthreaded collar 29 extends up the rod for the first portion of the entire rod. In this embodiment of the rod, the locking flange nut 12 and spacer 11 can be eliminated from the assembly.

As shown in FIG. 10-c, round base 28 fits within cylinder cavity 17. Having unthreaded collar of the same size as the threads on adjustment rod 8 permits the turning of the rod assembly without the risk of having wear occur to the inner of the cone.

FIGS. 10, 10-b and 10-a all illustrate that this alternate embodiment enhances rather than alters the appearance, operation or performance of the pipe support.

Figure 11:
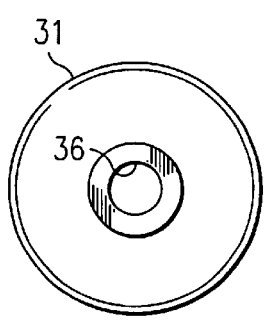
FIGS. 11 through 11-d show the components of another embodiment of the pipe roller.
Figure 11A:
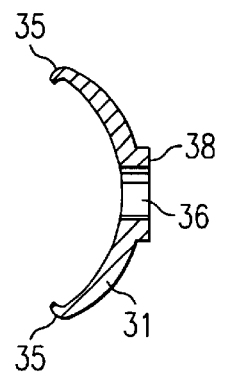
Figure 11B:
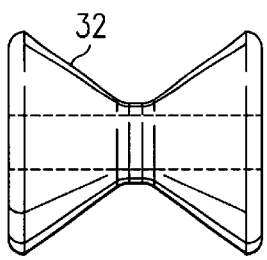
Figure 11C:
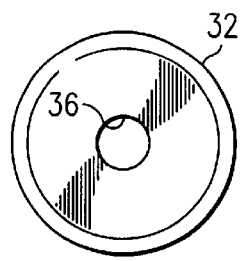
Figure 11D:
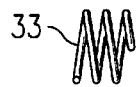

The individual components of the alternate embodiment of the pipe roller or fitted roller assembly 30 is disclosed in FIGS. 11 through 11-d. FIG. 11 is a end view of deflection cup 31. This cup is of a medium flexible rubber material. Round hole 36 appears in the center. Now to FIG. 11-a. The side sectional view is shown of one of a required two Deflection cups 31. Grasping collar 35 appears along the outer perimeter of this cup. Round hole 36 is revealed as is spring stopper base 38.

Now viewing pipe roller 32 which is a tapered rubber product shaped to conform the diameter of piping. FIG. 11-b is a side view of this roller while FIG. 11-c is an end view. Round hole 36 appears in the roller and extends from one end to the other along the axis of the roller.

Compression spring 33 is shown in FIG. 11-d. This spring is made of a durable weathering material and is tensioned sufficiently to permit it to collapse when pressure or force is applied but recoil when force is removed. Two are required.

Figure 12:
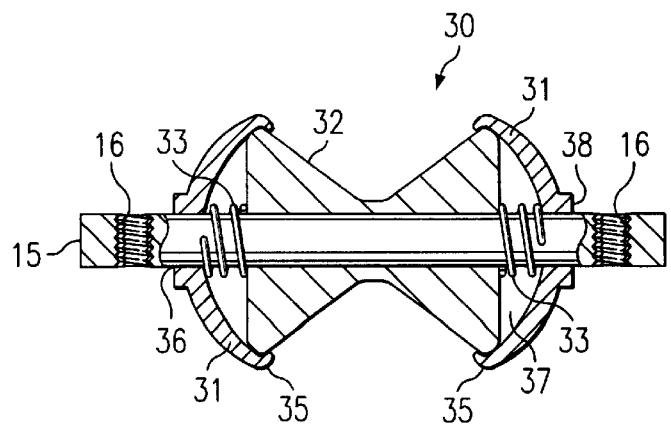
FIGS. 12 through 12-b demonstrate the assembly of this pipe roller.
Figure 12A:
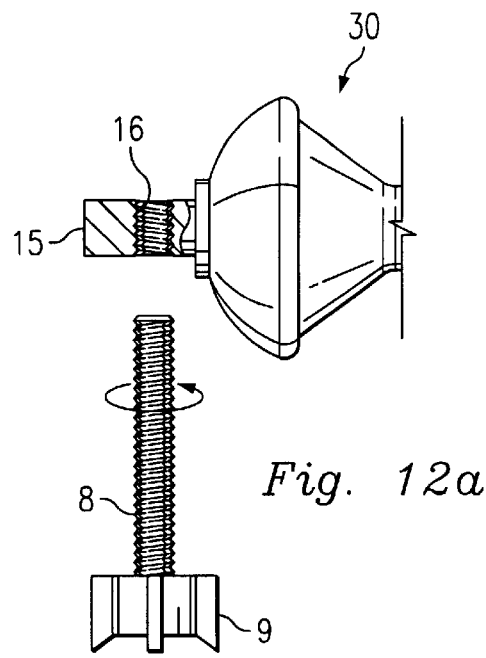
Figure 12B:
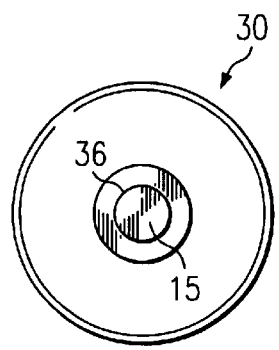

Now turning to FIG. 12, fully assembled fitted roller assembly 30 is disclosed. The figure demonstrates how cylinder shaft 15 passes through the axis of the roller assembly. Around this shaft and at opposing ends of the assembly are placed compression spring 33 and finally deflection cup 31. These two cups are fused to the outer round surface of pipe roller 32 at grasping collar 35, thus creating a flexible cavity at either end of the roller assembly. FIG. 12-b is a end view revealing cylinder shaft 15 passing through round hole 36 of fitted roller assembly 30.

FIG. 12-a discloses that the elevating operation of the assembly conforms to the operation of the standard embodiment of the invention.

Advantages

From the description, the reader will see the advantages of my invention.

(A) Uncommon with previous pipe supports, the neoprene pad affixed to the base provides added protection to the roofing surface.

(B) Unlike previous supports that required tools to adjust the vertical height of the supported pipe, the adjustment rod that itself freely turns makes for a more easily installed piping system. In an installation involving many feet of pipe over seemingly level yet uneven roof surface, the labor cost savings when my support is used will be very significant.

(C) The addition of a friction locking means assures the installer than inadvertent turning of the adjustment assembly will not occur due to unexpected vibration or other causes.

(D) Further advantages are achieved by the inclusion of the alternate embodiments of the fitted roller assembly. This assembly permits a certain quantity of lateral shifting of the piping system supported by the invention. In the case of typical pipe roller supports, it is intended that the pipe roller compensate for pipe expansion and contraction due to thermal heating of the pipe. This occurs along the length of the piping system. Having the means to compensate for lateral flexibility in the pipe support compensates for expansion that is present at turns and tees along the piping run is an additional advantage of the invention.

Operation of the Invention

Figure 5:
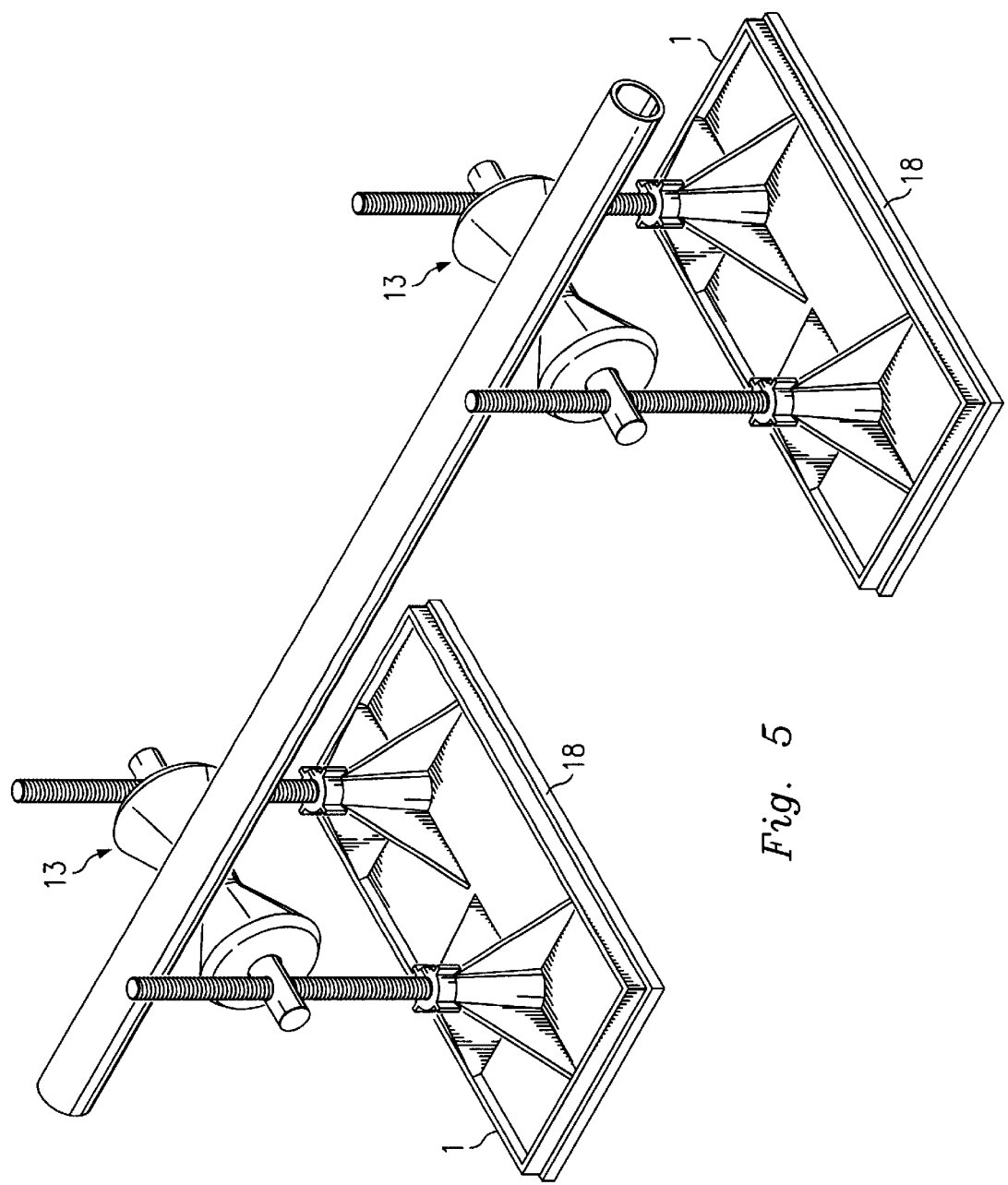
FIG. 5 is a perspective view of the adjustable pipe support assembly illustrating the technique of supporting piping across a flat roof.
Figure 3A:
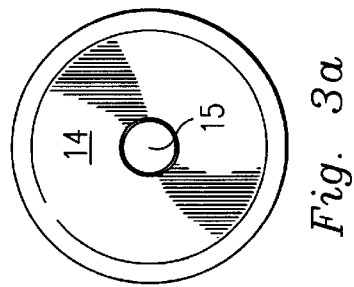

The manner of installing and adjusting my light duty adjustable pipe support assembly is unique to previous applied methods and apparatuses. For instance, as shown in FIG. 5, having the advantage of neoprene pad 18 affixed to the bottom surface of base 1 provides immediate cushioned support to the roof during the ongoing installation of the piping system. The piping is cradled within pipe roller support 13.

Figure 6:
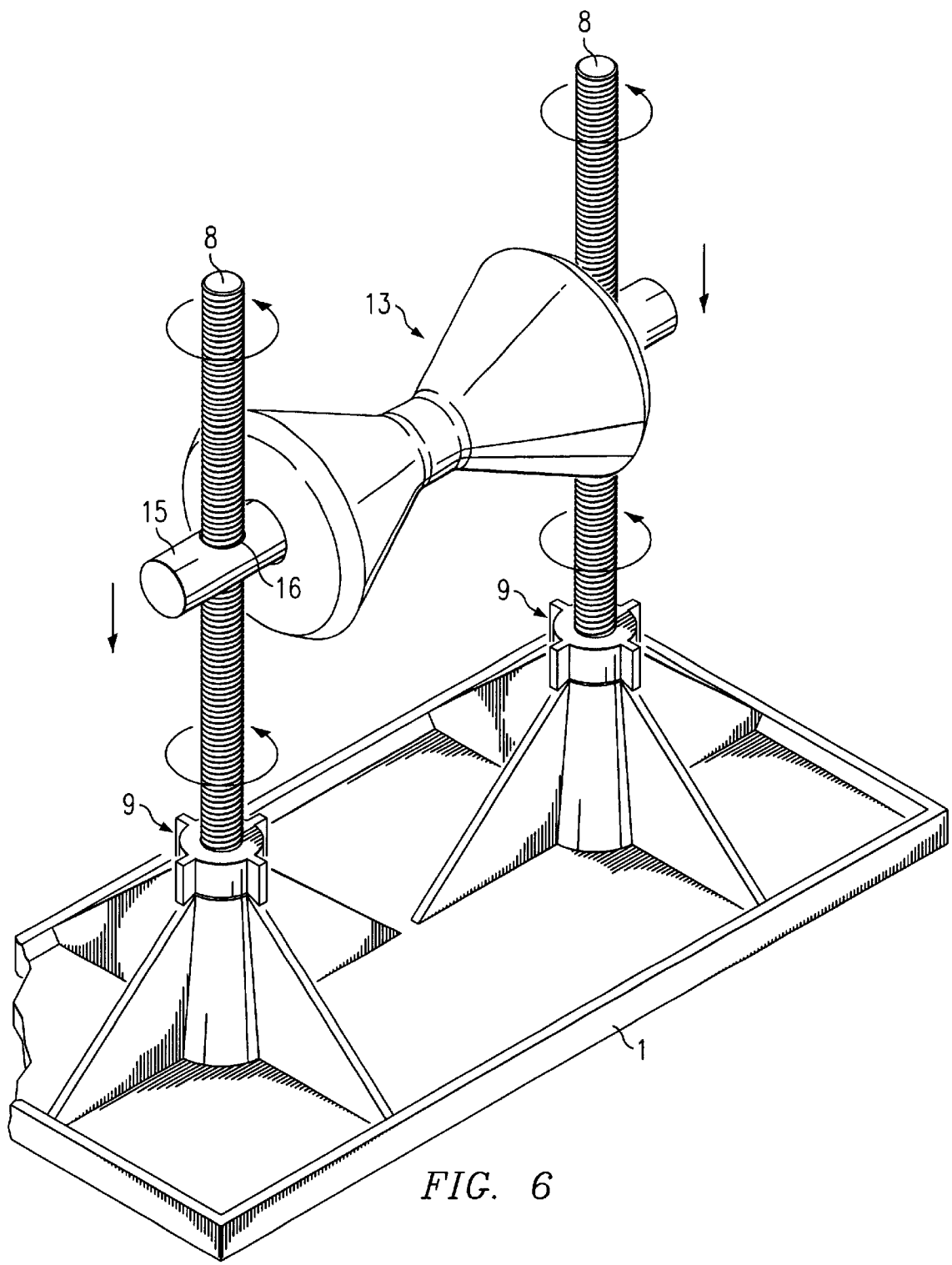
FIG. 6 is a perspective view of the adjustable pipe support assembly illustrating the technique of adjusting the vertical height of the pipe roller support.

As illustrated in FIG. 6, threaded adjustment rods 8 are easily hand turned with adjustment knobs 9. In unison, turning the knobs, thereby turning the rod permits pipe roller support 13 to travel up or down on the rod. The rods engage the support at female threaded holes 16 located at either end of cylinder shaft 15. This travel is the technique employed in the vertical adjustment of the pipe roller support.

Figure 13:
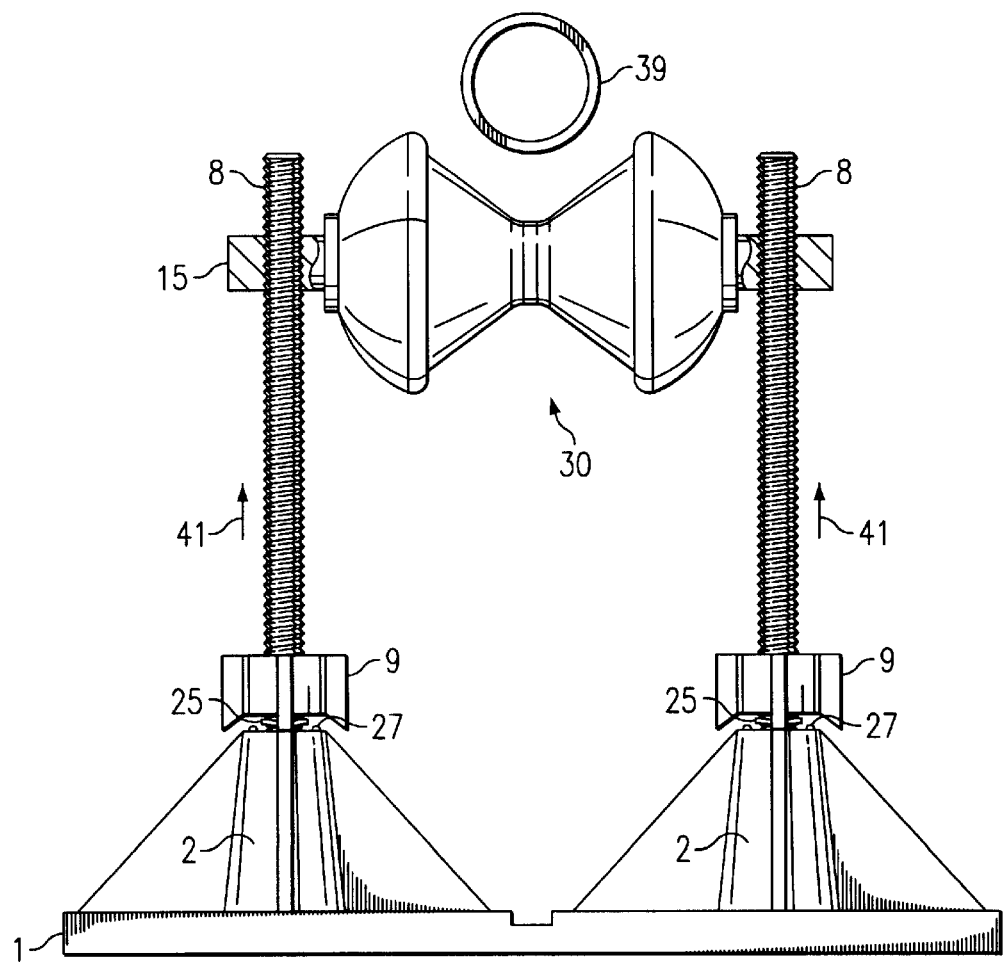
FIG. 13 illustrates the operation of the alternated embodiment of the knob assembly.
Figure 14:
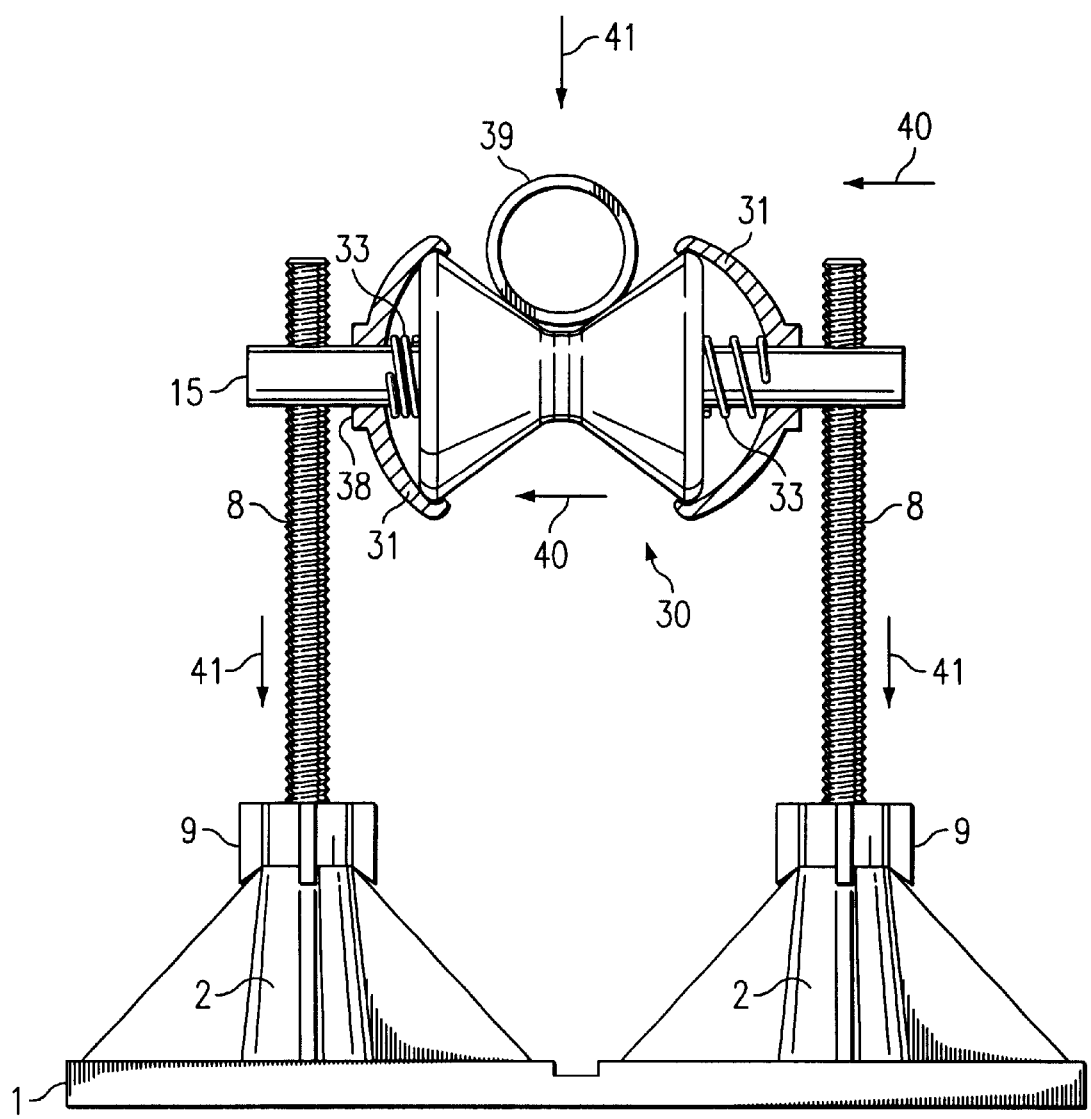
FIG. 14 illustrates the operation of the alternated embodiment of the pipe roller.

FIG. 13 and FIG. 14 illustrate the further advantages achieved by the inclusion of the alternate embodiments of the components of the invention. Shown in FIG. 13, fitted roller assembly 30 is positioned between the two adjustment assemblies represented by adjustment rods 8 and adjustment knobs 9. Illustrating that the weight that will be applied by placing pipe 39 atop the support is not present, wave washer 25 provides sufficient upward vertical force 41 to create separation between adjustment knob 9 and concentric cone 2. Thus, the knobs are free to be easily turned above extrusions 27 thereby making vertical adjustment easy for the installer.

FIG. 14 illustrates how when pipe 39 is placed on the pipe support device, that sufficient downward vertical force 41 occurs to allow the knob to rest squarely atop each cone. In this figure, the two extrusions are not visible due to their insertion into two of the four opposing indentations at the base of the adjustment knob. The wave washer also disappears into the round knob recession at the base of the knob.

Further illustrated as an advantage of this enhanced embodiment of the invention is the pipe support's ability to compensate for lateral movement in the pipe. As shown, when lateral force 40 is exerted along the piping system, then compression spring 33 contracts against spring stopper base 38 at the far side of the roller assembly, thus permitting the entire roller assembly to shift either to the left or right as needed. The nearest spring to the force expands slightly but recoils when the force is withdrawn. Having deflection cups 31 at either end of the roller assembly will permit the assembly to resume the center position when no lateral force is present. Additional, having this incorporated assembly helps to prevent the installer from inadvertently installing the pipe support to either side of the base during initial installation.

CONCLUSIONS, RAMIFICATIONS, AND SCOPE OF THE INVENTION

Thus the reader will see that the invented light duty adjustable pipe support assembly provides a practical, inexpensive method of supporting piping systems on a flat roof.

The neoprene pads provide immediate protection to the roof surface, a feature uncommon with previous support apparatuses.

The threaded adjustment rods with adjustment knob and friction locking device make vertical adjustment simple, expedient, and easy. The piping installer needs only to twist or turn the knobs to gain adjustment.

Figure 7:
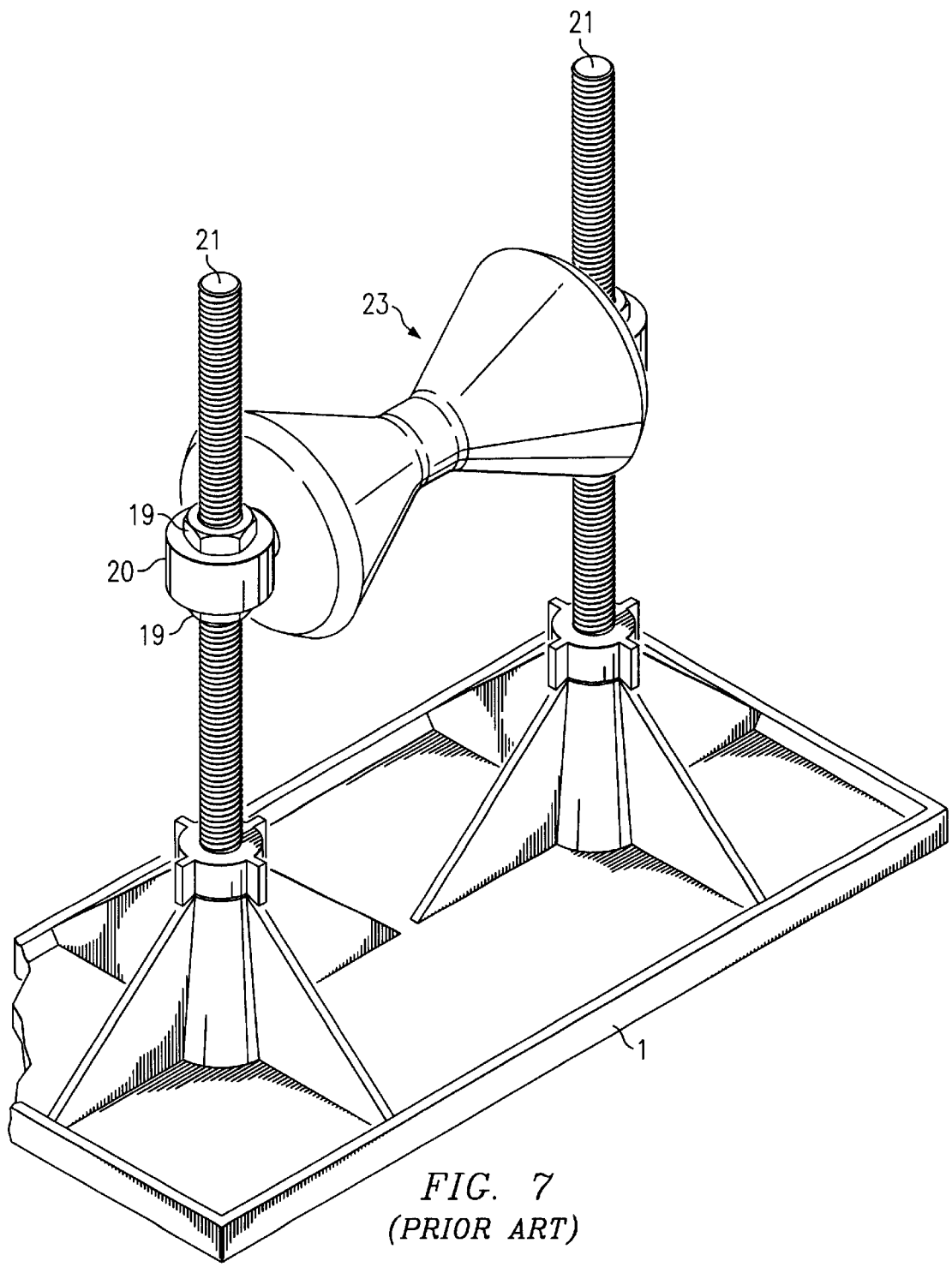
FIGS. 7 through 7-b demonstrate advantages the invention gains over other pipe supports utilizing previous methods of vertical adjustment.
Figure 7A:
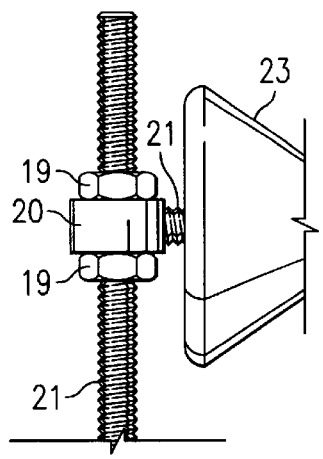
Figure 7B:
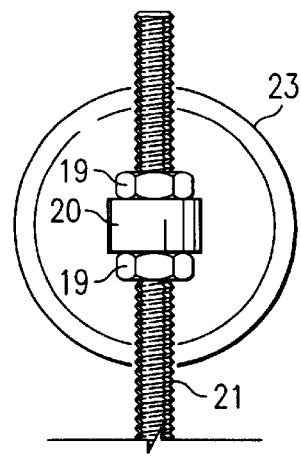

As illustrated in FIGS. 7, 7-a, and 7-b, previous pipe supports required tools such as wrenches or pliers to achieve vertical adjustment. The design of other roller supports is similar to my invention in that there exists a base, rods and a pipe roller. However, to make adjustments it is necessary to first use a tool at threaded nut 19 to loosen it from collar 20. Then the second nut 19 is turned either clockwise or counterclockwise on threaded rod 21 in order to achieve height adjustment of conventional pipe roller 23. Finally a tool is again used to tighten the nuts against the collar locking it in place. It is evident that my invention gains superiority over previous apparatuses.

Further, though the specifications and described operation of my invention leans towards the use as a vertical support permitting the upward adjustment of supported pipe, it should not be concluded that my invention cannot be utilized in other uses such as the horizontal mounting of piping traveling vertically or horizontally along a wall surface.

Although the description contains many specifications, these should not be construed as limiting the scope of the invention but as merely providing illustrations of the presently preferred embodiment of the invention. The many uses of the invention should not be limited by the example of use here in described. Thus the scope of the invention should be determined by the appended claims and their legal equivalents, rather than by the example given.

I claim:

1. An adjustable support assembly comprising:
    a support base comprising a base plate and two cones rising perpendicular from an upper surface of the base plate, each of said cones having a center hole and a cylinder shaped insertion cavity molded within the base, said insertion cavity having a smooth flat surface at the upper portion thereof;
    first and second rotatable threaded adjustment rods supported substantially parallel to each other by said support base, whereby said first and second threaded adjustment rods are mounted onto said cones of said support base to freely rotate therein;
    first and second adjustment members fixedly attached one each to said adjustment rods for rotating said adjustment rods; and
    a support member extending between said first and second parallel adjustment rods, said support member including first and second threaded apertures for receiving said first and second threaded adjustment rods.

2. The support assembly of claim 1 wherein said cones have a top surface with at least one extrusion to achieve a friction lock between said extrusion and said first and second adjustment members.

3. The support assembly of claim 2 wherein said support member is a pipe support comprising a round roller having a center hole extending through the axis and a cylinder shaft extending between the first and second parallel threaded adjustment rods and defining said first and second threaded apertures at each end thereof, said cylinder shaft inserted through the center of and supporting said roller.

4. The support assembly of claim 3 wherein said roller is made of rubber.

5. The support assembly of claim 3 wherein said shaft is made of metal.

6. The support assembly of claim 2 wherein said first and second adjustment members are upper positioned adjustment knobs having a bottom surface with at least one indentation on the bottom surface to engage with said extrusion on said cones whereby said friction lock will be achieved between said support base and said upper positioned adjustment knobs.

7. The support assembly of claim 2 wherein rotation of said adjustment rods results in movement of said support member along said threaded adjustment rods.

8. The support assembly of claim 2 wherein said support member is a channel support having affixed threaded nuts at either end.

9. An adjustable support assembly comprising:
    a support base;
    first and second rotatable threaded adjustment rods supported substantially parallel to each other by said support base, said threaded adjustment rods comprising:

a first portion having a selected diameter and defining a length of threads;

a second portion defining an unthreaded smooth collar having said selected diameter, and a third portion defining a round smooth base having a diameter greater than said selected diameter;

first and second adjustment members fixedly attached one each to said adjustment rods for individually and independently rotating a respective one of said adjustment rods; and a support member extending between said first and second parallel adjustment rods, said support member including first and second threaded apertures for receiving said first and second threaded adjustment rods.

10. A pipe support device that rotates around an axis and permits lateral travel of a pipe supported by said support device comprising:

a shaft member;

a roller having a first end and a second end and defining an aperture through said roller between said first end and said second end along said axis, said shaft member extending through and supporting said roller;

at least one retention cup attached to said first end of said roller to form at least one cavity there-between;

at least one spring partially compressed within said cavity and between said retention cup and said first end of said roller; and wherein said spring is biased to maintain said retention cup away from said first end of said roller so as to compensate for lateral movement of said pipe supported by said pipe support device.

11. The support device of claim 10 wherein said at least one retention cup comprises two retention cups attached one each to said first and second ends of said roller to form two cavities and wherein said spring within said cavity comprises a spring in each of said two cavities partially compressed between a retention cup and one of said first and second ends of said roller to compensate for lateral movement of said supported pipe in both directions along said axis.

12. An adjustable support assembly comprising:

a support base;

first and second rotatable threaded adjustment rods freely rotatable with respect to said support base and supported substantially parallel to each other by said support base;

first and second adjustment members fixedly attached one each to said adjustment rods for individually and independently rotating a respective one of said adjustment rods; and a support member extending between said first and second parallel adjustment rods, said support member including first and second end portions having first and second threaded apertures for engaging and being supported by said first and second threaded adjustment rods.

13. The support assembly of claim 12 wherein said support member is a pipe support comprising a roller having an axis and defining a center hole extending through the roller along the axis, and a cylinder shaft extending between said first and second parallel threaded adjustment rods and defining said first and second threaded apertures at each end thereof, said cylinder shaft inserted through the center of and supporting said roller.

14. The support assembly of claim 13 wherein said roller is made of rubber.

15. The support assembly of claim 13 wherein said shaft is made of metal.

16. The support assembly of claim 13 wherein said support member travels along said rotating adjustment rods in response to rotation of said rods thereby either drawing the support member closer towards the base or further from the base depending upon the direction of the rotation.

17. The support assembly of claim wherein 16 said parallel adjustment rods are positioned vertically.

18. The support assembly of claim 16 herein said parallel adjustment rods are positioned horizontally.

19. The support assembly of claim 13 wherein said roller includes a first and second end and said support member travels along said axis to compensate for lateral movement of said pipe further comprising:

a retention cup attached to said first end of said roller to form at least one cavity there-between;

a spring within said cavity and partially compressed between said retention cup and said first end of said roller; and wherein said spring maintains said retention cup away from said first end of said roller so as to compensate for lateral movement in a first direction.

20. The support assembly of claim 19 further comprising another retention cup attached to said second end of said roller and another spring partially compressed between said order retention cup and said second end of said roller to compensate for lateral movement in a direction opposite from said first direction.

21. The support assembly of claim 12 wherein each said threaded adjustment rods is secured to said support base by a respective one of said first and second adjustment members and a lower locking flanged nut and a round cylinder spacer.

22. The support assembly of claim 12 wherein said first and second adjustment members are threaded adjustment knobs.

23. The support assembly of claim 12 wherein rotation of said adjustment rods results in movement of said support member along said threaded adjustment rods.

24. The support assembly of claim 12 wherein said support member travels along said rotating adjustment rods in response to the rotation of said rods thereby either drawings the support member closer towards the base or further from the base depending upon the direction of the turn.

25. The support assembly of claim 24 wherein said parallel threaded adjustment rods are positioned vertically.

26. The support assembly of claim 24 wherein said parallel threaded adjustment rods are positioned horizontally.

27. The support assembly of claim 12 wherein said support member is a channel support having affixed threaded nuts at either end.

* * * * *